United States Patent [19]

Cheng et al.

[11] Patent Number: 5,750,178
[45] Date of Patent: May 12, 1998

[54] METHOD OF MAKING COFFEE PARTICLES CONTAINING AROMA

[75] Inventors: Pu-Sheng Cheng, Dublin; Robert Garwood, Bellefontaine; Zenon Ioannis Mandralis, Dublin, all of Ohio; James Tuot, Newtown, Conn.; Scott Westfall, Marysville, Ohio

[73] Assignee: Nestec S.A., Vevey, Switzerland

[21] Appl. No.: 665,786

[22] Filed: Jun. 18, 1996

[51] Int. Cl.⁶ ............................................ A23F 5/00
[52] U.S. Cl. ................... 426/594; 426/388; 426/516; 426/474
[58] Field of Search ....................... 426/594, 516, 426/387, 474, 448, 650, 651, 488

[56] References Cited

U.S. PATENT DOCUMENTS

| | | | |
|---|---|---|---|
| 3,989,852 | 9/1976 | Palmer | 426/289 |
| 4,072,761 | 2/1978 | Margolis et al. | 426/387 |
| 4,262,029 | 4/1981 | Kleiner et al. | 426/512 |
| 4,837,039 | 6/1989 | Escola Gallart et al. | 426/572 |
| 4,919,962 | 4/1990 | Arora et al. | 426/594 |
| 4,952,417 | 4/1990 | Escola Gallart et al. | 426/572 |
| 5,035,908 | 7/1991 | Arora et al. | 426/388 |
| 5,079,026 | 1/1992 | Arora et al. | 426/594 |
| 5,182,926 | 2/1993 | Carns et al. | 62/352 |
| 5,342,638 | 8/1994 | Koch | 426/386 |
| 5,399,368 | 3/1995 | Garwood et al. | 426/307 |
| 5,474,792 | 12/1995 | Arora et al. | 426/594 |

FOREIGN PATENT DOCUMENTS

| | | |
|---|---|---|
| 837021 | 3/1970 | Canada . |
| 0 008 015 | 10/1982 | European Pat. Off. . |
| 0 133 636 | 1/1987 | European Pat. Off. . |
| 0 354 810 | 2/1995 | European Pat. Off. . |
| 94/23593 | 10/1994 | WIPO . |
| 96/09773 | 4/1996 | WIPO . |

*Primary Examiner*—Anthony J. Weier
*Attorney, Agent, or Firm*—Pennie & Edmonds LLP

[57] ABSTRACT

A method of producing coffee particles containing entrapped aroma. Soluble coffee solids and up to 10% by weight water are introduced into a heating and mixing zone and to raise the temperature to about 85° C. to about 130° C. to form a molten mass. Aroma-containing substrate is introduced into the molten mass to form a molten mixture containing a gas under a pressure of about 2.0 MPa to about 7.0 MPa. The molten mixture is extruded into a pressure zone in which the pressure is greater than the pressure of the gas in the molten mixture and the molten mixture is retained in the pressure zone until it solidifies to form a hardened glass. The hardened glass is ground into coffee particles of size of about 0.5 mm to 3 mm.

17 Claims, 2 Drawing Sheets

METHOD OF MAKING COFFEE PARTICLES CONTAINING AROMA

FIELD OF THE INVENTION

This invention relates to a method of providing coffee particles in which aroma is entrapped and to the aroma-containing coffee particles produced by the method. More particularly, the invention relates to the production of coffee particles formed of hardened carbohydrate glass and containing entrapped aroma.

BACKGROUND TO THE INVENTION

To produce soluble coffee powders, ground roasted coffee is typically extracted with an aqueous liquid, the extract filtered, concentrated by evaporation and converted into powder by freeze drying or spray drying. However, one of the major problems with this type of process is that the soluble coffee powders obtained lack the aroma of freshly brewed coffee. This arises because the extraction, concentration and drying steps normally utilized in industrial production of soluble coffee powders result in degradation and almost total loss of volatile aroma constituents. However it is generally found that consumers associate a quality coffee product with a good coffee aroma. If a coffee product lacks coffee aroma, consumer perception of the product is adversely affected.

For this reason, it is conventional to trap coffee aromas that are given off during the production of the soluble coffee powders and to later reincorporate these aromas into the soluble coffee powders. Various techniques have been used for reincorporating coffee aroma into soluble coffee powders. One commonly used technique for reincorporating the aroma is to first capture the aroma into a suitable substrate; for example a coffee oil, an emulsion containing coffee oil, or a coffee extract. The aroma-containing substrate is then mixed with the soluble coffee powder prior to the soluble coffee powder being filled into containers. Unfortunately, the aroma usually escapes readily from the substrate. Therefore losses of aroma occur prior to filling of the soluble coffee powder into containers and especially once the consumer breaks the seal of the container. Also, although these techniques are able to provide aroma in the coffee container, very little aroma is provided above a cup of coffee made from the soluble coffee powder.

These problems have led to various attempts to encapsulate the coffee aroma to retain the aroma until the soluble coffee powder is dissolved in hot water. The intention is to cause the release of coffee aroma from the cup. One attempt is described in U.S. Pat. No. 3,989,852 which discloses a process of preparing coffee aroma capsules by formulating the aroma into a viscous medium with a low moisture content. The viscous medium is formed into tacky particles which are then rolled in a film forming agent. The film forming agent is then allowed to dry to provide a capsule about the aroma. Unfortunately, the amount of aroma that may be encapsulated per capsule using this process is rather low. It is also found that the capsules do not retain the aroma for any considerable length of time. Also, little or no aroma is provided above the cup upon adding of hot water to the soluble coffee powder.

European patent application 0008015 discloses a process for encapsulating coffee aroma in which an aromatic coffee distillate is mixed with coffee oil to provide a water-in-oil emulsion. The water-in-oil emulsion is then atomized and the individual droplets are rolled in fine soluble coffee powder. The droplets are then allowed to dry to form a capsule of dried coffee solids about an oil core that contains the aroma. Although the capsules are satisfactory, again little or no aroma is provided above the cup upon adding of hot water to the soluble coffee powder.

Canadian Patent 837,021 discloses a process for encapsulating coffee aroma in which coffee oil is homogenized with a coffee extract containing up to 40% coffee solids. An aroma condensate is then stirred into the homogenized mixture. The mixture is then sprayed onto soluble coffee powder and the soluble coffee powder mixed and tempered to equilibrate the moisture throughout the soluble coffee powder. After tempering, the moistened powder is vacuum dried. Unfortunately, considerable amounts of aroma are lost during vacuum drying. Also little or no aroma is provided above the cup upon adding of hot water to the soluble coffee powder To provide better entrapment of the aroma compounds, recent attempts have been made to use hardened coffee glass for entrapping the aroma. For example, in U.S. Pat. No. 5,399,368, an aromatized coffee oil is co-extruded with molten coffee solids to form an extrudate having an inner oil core surrounded by a tube of molten coffee solids. The extrudate is then cut into segments which form capsules which are then allowed to dry. Upon addition of hot water, the capsules rise to the surface of the beverage before breaking open and releasing the aromatized oil. A burst of aroma above the beverage may then be perceived.

However, although the capsules provide excellent entrapment of the aroma, the machinery required for the formation of the capsules from the extrudate is relatively complicated and requires careful control. Therefore there is still a need for means of entrapping aroma which provides relatively good entrapment, which is simple to produce and which provides aroma above the cup upon adding of hot water to the soluble coffee powder.

SUMMARY OF THE INVENTION

Accordingly, in one aspect this invention provides a method of producing coffee particles containing entrapped aroma; the method comprising:

introducing soluble coffee solids into a heating and mixing zone and raising the temperature to form a mass of molten soluble coffee solids;

introducing an aroma-containing substrate into the mass of molten soluble coffee solids to form a molten mixture of the aroma-containing substrate and the molten soluble coffee solids, the molten mixture containing a gas under pressure;

extruding the molten mixture into a pressure zone in which the pressure is greater than the pressure of the gas in the molten mixture and retaining the molten mixture in the pressure zone until the molten mixture solidifies to form a hardened glass; and comminuting the glass into coffee particles.

The process has the advantage that it is relatively simple yet the coffee particles retain the aroma to a surprisingly high degree. Further, the gas is also retained in the hardened coffee glass in a highly compressed state and hence the density of the coffee particles is not substantially altered. Also, upon addition of hot water, the coffee particles fracture due to the increase in pressure within the particles caused by thermal energy; releasing a burst of aroma. Further, the fractured pieces of the coffee particles become wetted and soften in the hot water. This results in expansion of the fractured pieces and a reduction in density, causing the pieces to float to the top of the beverage prior to dissolving. Therefore a lingering aroma effect is provided.

The coffee solids introduced into the heating and mixing zone may be in the form of a mixture of soluble coffee solids and water. Preferably, the mixture of soluble coffee solids and water is made up of about 90% by weight to about 100% by weight of soluble coffee solids; more preferably about 92% by weight to about 100% by weight of soluble coffee solids.

The temperature of the molten soluble coffee solids and water is preferably raised to about 10° C. to about 50° C. above the glass transition temperature of the soluble coffee solids. The temperature of the molten soluble coffee solids is preferably raised to a temperature in the range of about 85° C. to about 130° C.; more preferably about 90° C. to about 110° C.

The aroma-containing substrate preferably comprises coffee oil and coffee aroma constituents dissolved in the coffee oil. Alternatively the aroma-containing substrate may be in the form of a solid frost containing water, carbon dioxide and coffee aroma constituents.

Preferably the aroma-containing substrate has the gas under pressure contained in it for incorporating the gas into the molten mixture. Alternatively, the gas may be injected into the mass of molten coffee solids or into the molten mixture. The gas may be nitrogen gas or carbon dioxide gas. In a further alternative, a gassing agent may be added to the soluble coffee solids, the mass of molten soluble coffee solids, the aroma-containing substrate, or the molten mixture for providing the gas under pressure in the molten mixture. The gassing agent is preferably frozen or liquid carbon dioxide or aroma frost containing frozen carbon dioxide.

The pressure of the gas in the molten mixture is preferably in the range of about 2.0 MPa to about 7.0 MPa; for example about 2.4 MPa to about 5.1 MPa.

Preferably the soluble coffee solids are mixed and heated in an extruder. Further, the aroma-containing substrate is preferably introduced into the extruder to provide the molten mixture. The aroma-containing substrate is preferably uniformly dispersed in the molten mixture.

In another aspect, this invention provides coffee glass particles containing entrapped gas at a pressure of about 2.0 MPa to about 7.0 MPa and coffee aroma constituents, the coffee glass particles fracturing into pieces upon addition of water at a temperature of at least about 60° C. due to expansion of the entrapped gas to release coffee aroma constituent and the fractured pieces dissolving in the water.

Preferably, the coffee glass particles have a density in the range of about 1.1 g/ml to about 1.4 g/ml. Further the coffee glass particles preferably have a size in the range of about 0.5 mm to about 3 mm.

The coffee glass particles preferably contains about 2% to about 15% by weight of a substrate which contains the coffee aroma substituents. Further the coffee glass particles preferably contain about 7 to about 20 ml of gas per g of coffee solids.

In a further aspect, this invention provide coffee glass particles produced by a method as defined above.

In a yet further aspect, this invention provides a coffee beverage powder which comprises particles of soluble coffee solids and coffee glass particles as defined above.

BRIEF DESCRIPTION OF THE DRAWINGS

Embodiments of the invention are now described, by way of example only, with reference to the drawings in which.

DETAILED DESCRIPTION OF EMBODIMENTS OF THE INVENTION

Figure 1:
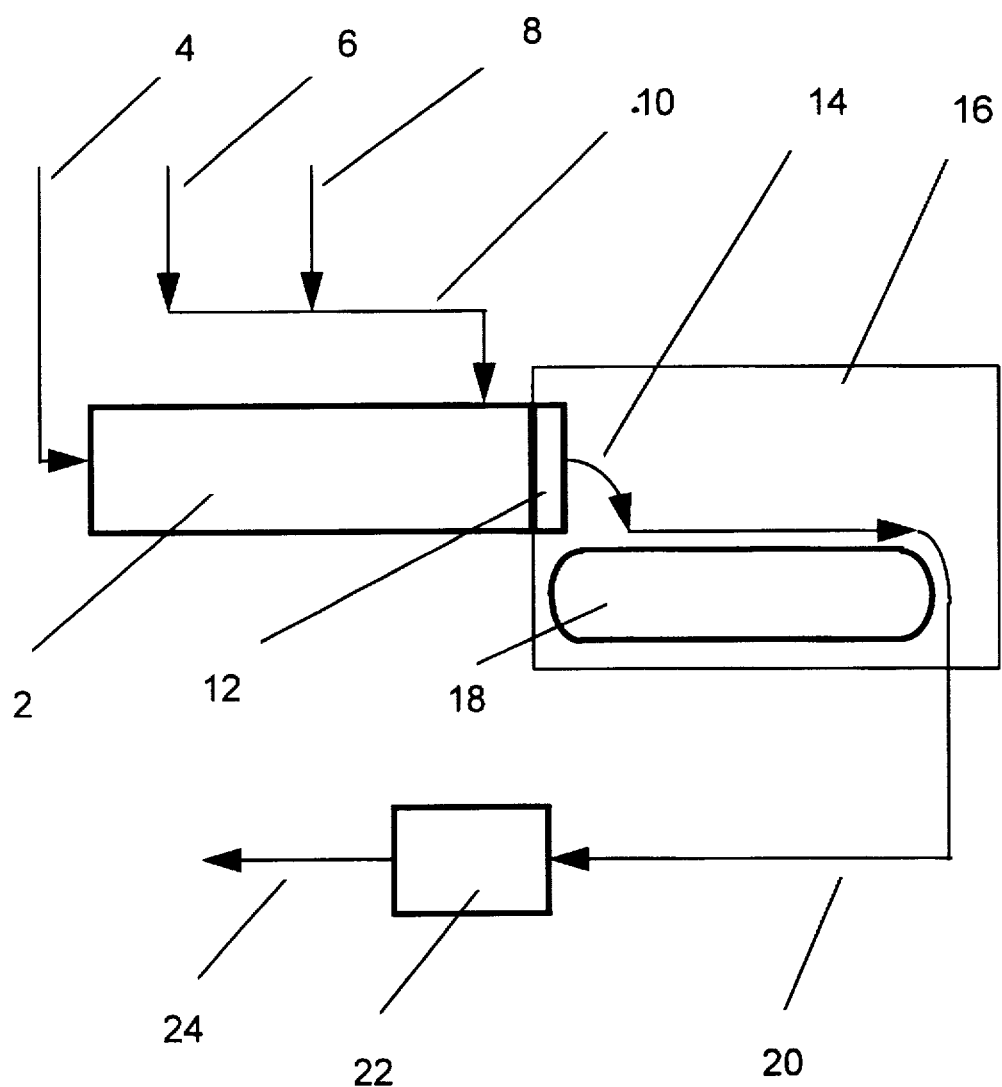
FIG. 1 is a schematic flow diagram of a process for producing aromatized coffee particles.

A first embodiment of the invention is now described with reference to FIG. 1. To produce the coffee particles, a feed mixture 4 of soluble coffee solids and optionally water is required. This feed mixture 4 may be prepared in several ways; the manner selected being a matter of preference.

For example, the feed mixture 4 may be prepared by mixing together water and soluble coffee powder obtained from an extraction, concentration and drying process. Suitable extraction, concentration and drying processes are well known and examples are described in Sivetz (1979). Alternatively, a dilute coffee extract obtained from an extraction process may be mixed with soluble coffee powder. As a further alternative, the feed mixture 4 may be provided in the form of a concentrated coffee extract. The concentrated coffee extract may be obtained by suitably concentrating a coffee extract obtained from a coffee extraction process. Suitable concentration processes are well known and examples are described in Sivetz (1979) or U.S. Pat. No. 5,035,908. For best results, the concentration of the soluble coffee solids in the feed mixture 4 is in the range of about 90% by weight to about 100% by weight. The glass transition temperature of the mixture is preferably in the range of about 30° C. to about 80° C.

Once prepared, the feed mixture 4 is fed into an extruder 2 in which it is mechanically worked and the temperature of the mixture 4 is raised to form a mass of molten coffee solids. The temperature required to form the mass of molten coffee solids will vary depending upon the glass transition temperature of the feed mixture 4. However the temperature reached in the extruder is usually in the range of 85° C. to about 130° C. for most feed mixtures 4. A temperature of about 10° C. to about 50° C. above the glass transition temperature of the feed mixture 4 is particularly suitable.

The extruder 2 used to mix and heat the feed mixture 4 may be any suitable extruder of which many are commercially available. The type of extruder selected is a matter of preference. Suitable extruders may be obtained from Werner-Pfeiderer Inc, Wenger Manufacturing Inc. Clextral SA, and the like.

An aroma-containing substrate 6 is added to the mass of molten coffee solids in the extruder 2. The substrate for carrying the aroma is conveniently coffee oil or an emulsion based upon coffee oil. The coffee oil which is used may be any desired coffee oil; for example coffee oil obtained from commercial sources or produced by extracting it from spent coffee grounds and the like using procedures which are well known in the art. For example, the coffee oil may be expelled from freshly roasted coffee beans using commercially available oil expellers. This technique and other suitable techniques for extracting coffee oil from coffee beans, are described in Sivetz (1979); pages 452 to 460. The source and the exact composition of the coffee oil used is not critical. Other edible oils may be used in replacement of coffee oil but this is not preferred; particularly if the resulting coffee particles are to be considered pure coffee.

The aroma carried by the substrate is preferably coffee aroma. Conveniently, the coffee aroma is made up of natural coffee aroma gases. The coffee aroma gases may be collected at any of several points in the processing of coffee, for example gases evolved during roasting of green coffee ("roaster gases"), gases evolved during grinding of roasted whole beans ("grinder gases") and those evolved during infusion of ground roasted coffee ("infusion gases"). Preferably, the coffee aroma is used in the form of a cryogenically condensed, aroma frost which may be produced as described in U.S. Pat. No. 5,182,926; the disclosure of which is incorporated by reference. Of course, synthetic coffee aroma gases may also be used. Also, other desired aromas; for example vanilla, almond, chocolate, whisky, brandy, Irish creme, etc. may be included.

The aroma may be incorporated into the substrate by simply mixing the aroma and substrate; for example in a ribbon blender. Other alternatives include those described in U.S. Pat. No. 5,182,926, those described in U.S. Pat. No. 5,342,638 (the disclosure of which is incorporated by reference), absorbing the aroma into the substrate, or the like.

A gas 8 is incorporated into the aroma-containing substrate 6 by injecting it under pressure into the aroma-containing substrate 6. Suitable mi(not shown) ms (not shown) may be used to mix the aroma-containing substrate 6 and the gas 8; for example static mixers and the like.

The pressure of the gas 8 is selected such that sufficient gas 8 is taken up into the aroma-containing substrate 6 to fracture the coffee particles ultimately produced when they are contacted with water at a temperature of at least 60° C.; but not at room temperature. This pressure may vary according to the temperature of the gas 8, the hardness of the coffee particles ultimately produced, and the like. However, for most applications in which the gas 8 is introduced at room temperature, the gauge pressure of the gas 8 is suitably in the range of about 2.0 MPa to about 7.0 MPa ; preferably about 2.4 MPa to about 5.1 MPa. For example, at a these pressures, about 7 to about 20 ml of gas is introduced into each gram of aroma-containing substrate 6. This is generally sufficient to fracture the coffee particles ultimately produced upon addition of water at 60° C.

The gas 8 is any suitable food grade gas which has low reactivity with the other components of the coffee particles. Suitable gases include carbon dioxide and nitrogen.

The gasified substrate 10 is then introduced into the extruder 2 to be combined with the mass of molten coffee solids in the extruder 2. To prevent thermal degradation of the aroma, it is best to introduce the gasified substrate 10 into the extruder 2 as close as possible to the end of the extruder 2 while still obtaining adequate mixing of the gasified substrate 10 and mass of molten coffee solids.

The molten mixture of gasified substrate and mass of molten coffee solids is then forced through a die assembly 12. The die assembly 12 has one or more orifices (not shown), suitably of diameter in the range of about 0.5 mm to about 2.5 mm, through which the molten mixture is forced.

The extrudate leaving the die assembly 12 enters a pressure chamber 16. Because the extrudate is at a temperature above the glass transition temperature, it still plastic; being relatively soft and pliable. Therefore, to prevent foaming of the extrudate caused by expansion of the gas, an external pressure is applied to the extrudate 14. A suitable conveyor 18 is positioned in the pressure chamber 16 to convey the extrudate 14 away from the die assembly 12 so that continuous production may be achieved. However the extrudate 14 is retained in the pressure chamber 16 until the molten coffee solids have cooled sufficiently to undergo transition to a hard, glass state. Hence, because the pressure at the surface of the extrudate 14 is equal to or larger than that at the core of the extrudate 14, the extrudate 14 is prevented from rupturing or foaming while the coffee solids are still soft and pliable.

The pressure chamber 16 is maintained under elevated pressure by any suitable means which delivers air or other gas under pressure into the pressure chamber 16. When cooled to below the glass transition temperature the coffee solids solidify to form a hard coffee glass of sufficient strength to retain the gas in the extrudate. If necessary or desired, the pressure chamber 16 may be cooled to facilitate rapid cooling of the extrudate 14. The time required for cooling may be selected as desired; for example times of about 1 minute to 2 hours are acceptable.

The hardened extrudate 20 is then conveyed from the pressure chamber 16 to a suitable comminuting means 22 where it is broken up into particles of size of about 1 mm to about 3 mm. Any suitable comminuting means may be used. To reduce the extent of comminution required, it is preferable for the extrudate 14 to be extruded through small orifices in the die assembly 12. Alternatively or in addition, the extrudate 14 leaving the die assembly 12 may be stretched or rolled prior to it hardening to reduce its thickness.

The coffee particles 24 leaving the comminuting means 22 are then collected and, if desired, screened to obtain a desired size fraction.

Figure 2:
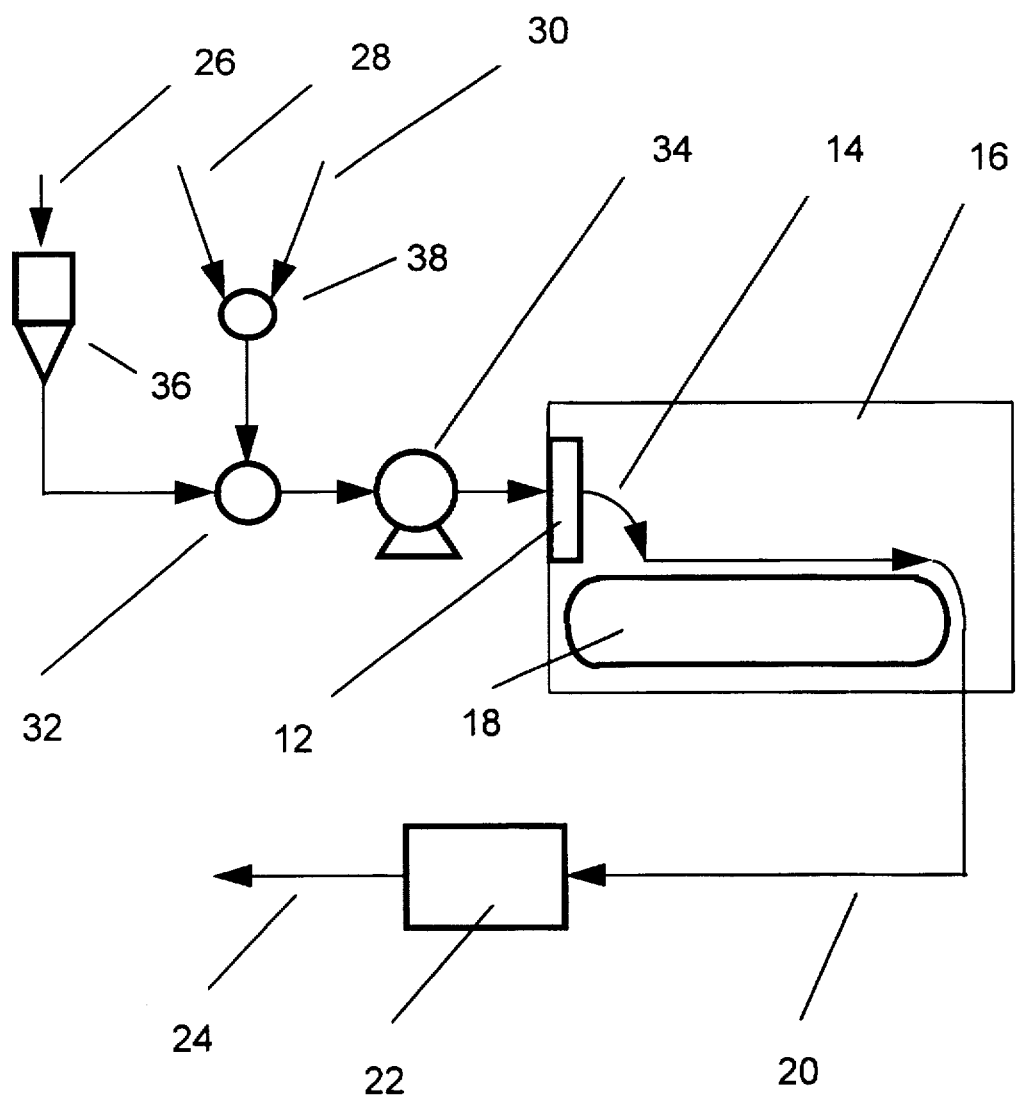
FIG. 2 is a schematic flow diagram of another process for producing aromatized coffee particles.

A second embodiment of the invention is now described with reference to FIG. 2. A feed mixture 26 of soluble coffee solids and optionally water is fed into a heated tank 36. The feed mixture 26 is as described with reference to FIG. 1. The heated tank 36 includes a stirrer and suitable heating means such as a steam jacket so that the feed mixture 26 may be heated and stirred to form a mass of molten coffee solids. The temperature required to form the mass of molten coffee solids will vary depending upon the glass transition temperature of the feed mixture 26. However the temperatures mentioned above with reference to FIG. 1 are suitable. The mass of molten coffee solids is then pumped to a mixer 32.

An aroma-containing substrate 28 is fed into a mixer 38. The aroma-containing substrate 28 is as described with reference to FIG. 1. A gas 30 is also fed into the mixer 38 to be incorporated into the aroma-containing substrate 28 to produce a gasified substrate. The mixer 38 may be any suitable mixer, for example a static mixers. The gas 30 and the pressure of the gas 30 is selected as described with reference to FIG. 1.

The gasified substrate 10 is then introduced into the mixer 32 to be combined with the mass of molten coffee solids. The molten mixture of gasified substrate and mass of molten coffee solids is then forced through a die assembly 12 by a pump 34. The pump 34 may be any suitable pump or pump arrangement which is able to deliver the molten mixture continuously and at high pressure to the die assembly 12. A gear pump or the pump assembly described in U.S. Pat. No. 5,399,368 are suitable examples.

The extrudate leaving the die assembly 12 is then processed as described above with reference to FIG. 1.

It is to be understood that numerous modifications may be made to the embodiments described above without departing from the scope of the invention. For example, with reference to FIG. 1, it is not necessary for the gas 8 to be first injected into the aroma-containing substrate 6. Instead, the gas 8 may be injected directly into the extruder 2. Similarly, with reference to FIG. 2, the gas 30 may be injected directly into the mass of molten coffee solids at some suitable point.

As a further alternative, instead of injecting gas, a gassing agent may be incorporated into the feed mixture, the aroma-containing gas, or the mass of molten coffee solids. The gassing agent may be any suitable food grade agent; for example bicarbonate or carbonate salts. Preferably however, the gassing agent is in the form of frozen or liquid carbon dioxide or aroma frost which contains significant amounts of frozen carbon dioxide. At the temperatures of operation, the carbon dioxide will rapidly become a gas.

EXAMPLE 1

A batch of 250 g of soluble coffee powder (containing 3% by weight moisture) is placed into an autoclave of 2 liter capacity. The autoclave is equipped with an electrically heated jacket, a mixer, ports for injecting and venting gases, and a temperature probe. An amount of 8 g of frozen, aromatized coffee oil and 4g of water are added to provide a total moisture content of 4.5% by weight. The autoclave is sealed and carbon dioxide is injected into the autoclave at a pressure of 2.51 MPa. The mixer is turned on and the temperature is raised to 121° C. During the increase in temperature, the pressure increases to 4.58 MPa.

After the temperature reaches 121° C., the contents are stirred for a further 15 minutes. The autoclave is then immersed in an ice bath to reduce the temperature of the contents to 23° C. The pressure is released and the autoclave opened.

The contents of the autoclave are in the form of a hard coffee glass containing dispersed droplets of aromatized oil and gas bubbles. The coffee glass is collected and ground to a size in the range of 0.5 mm to 3 mm. The resulting coffee glass particles are stored in a sealed glass jar at room temperature.

A sample of the coffee glass particles is placed in a beaker and about 150 ml of water at 80° C. is added. Fracturing of the coffee glass particles, determined by a "crackling" sound, begins within 0.1 seconds. Aroma is immediately released and can be detected above the beaker. The aroma is sniffed and judged to be roasty, coffee-like and balanced. The fractured coffee glass particles dissolve within 1 minute.

After a year of storage, a sample of the coffee glass particles is placed in a beaker and about 150 ml of water at 80° C. is added. Again explosive fracturing of the coffee glass particles, determined by a "crackling" sound, begins within 0.1 seconds. Aroma is immediately released and can be detected above the beaker. This indicated very effective entrapment of the gas and aroma.

EXAMPLE 2

An autoclave of 2 liter capacity (as described in example 1) is precooled with liquid nitrogen and 16.2 g of a cryogenically recovered coffee aroma frost is placed in it. The frost contains about 32% by weight water; the remainder being carbon dioxide and coffee aroma. A batch of 250 g of soluble coffee powder (containing 3% by weight moisture) is then placed into the autoclave. The total moisture content of the contents of the autoclave is about 4.7% by weight. The autoclave is sealed and carbon dioxide is injected into the autoclave at a pressure of 2.34 MPa. The mixer is turned on and the temperature is raised to 121° C. During the increase in temperature, the pressure increases to 5.27 MPa.

After the temperature reaches 121° C., the contents are stirred for a further 15 minutes. The autoclave is then immersed in an ice bath to reduce the temperature of the contents to 30° C. The pressure is released and the autoclave opened.

The contents of the autoclave are in the form of a hard coffee glass containing dispersed gas bubbles. The coffee glass is collected and ground to a size in the range of 0.5 mm to 3 mm. The resulting coffee glass particles are stored in a sealed glass jar at room temperature.

A sample of the coffee glass particles is placed in a beaker and about 150 ml of water at 80° C. is added. Fracturing of the coffee glass particles, determined by a "crackling" sound, begins within 0.1 seconds. Aroma is immediately released and can be detected above the beaker. The aroma is sniffed and judged to be roasty, coffee-like and balanced. The fractured coffee glass particles dissolve within 1 minute.

After a year of storage, a sample of the coffee glass particles is placed in a beaker and about 150 ml of water at 80° C. is added. Again explosive fracturing of the coffee glass particles, determined by a "crackling" sound, begins within 0.1 seconds. Aroma is immediately released and can be detected above the beaker. This indicated very effective entrapment of the gas and aroma.

EXAMPLE 3

Soluble coffee powder (containing 3% by weight moisture) is fed into a twin screw extruder (Buhler, DNDG-62/28D) at a rate of 908 g/min. The mechanical energy generated in the extruder forms a mass of molten coffee solids. The extruder is fitted with a cooling jacket to control the temperature of the molten coffee solids. Nitrogen gas is injected into the molten solids in the extruder at a pressure of about 2 MPa and at a flow rate of 13 l/min. A short distance prior to the die, aromatized coffee oil is fed into the extruder at a rate of 66 g/min. The temperature of the extrudate leaving the die is about 95° C.

The extrudate is directed into a sampling pig in which the pressure is maintained at about 3.54 MPa using a back pressure control valve. Once steady state is reached, the extrudate is diverted to another outlet and the sampling pig is isolated, immersed in an ice bath, and cooled to room temperature.

The contents of the sampling pig are in the form of a hard coffee glass containing dispersed droplets of aromatized oil and gas bubbles. The coffee glass is collected and ground to a size in the range of 0.5 mm to 3 mm. A sample of the coffee glass particles is placed in a beaker and about 150 ml of water at 80° C. is added. Fracturing of the coffee glass particles begins within 0.1 seconds. Aroma is immediately released and can be detected above the beaker. The aroma is sniffed and judged to be roasty, coffee-like and balanced. The fractured coffee glass particles dissolve within 1 minute.

The density of the coffee glass particles is about 1.3 g/ml.

EXAMPLE 4

A premeasured amount of soluble coffee powder is mixed with sufficient water to produce a thick, viscous coffee paste having a coffee solids content of 92% by weight. The coffee paste is heated to about 90° C. and is pumped at a pressure of about 19 MPa using an ISCO 500D syringe to a static mixer. Aromatized coffee oil is carbonated by injecting carbon dioxide gas at a pressure of 2.1 MPa into the oil and the oil and carbon dioxide mixed. The aromatized, carbonated oil is pumped to the static mixer where it is mixed with the molten coffee paste.

The molten mixture is then pumped to an extrusion die assembly using a piston pump assembly. The molten mixture is extruded as a continuous extrudate from a die orifice having a diameter of 1.98 mm (0.078 in.) at a rate of 6 ml/minute. The continuous extrudate is extruded into a pressure chamber that is maintained at a pressure above 3.5 MPa under carbon dioxide gas. The chamber is maintained at a temperature of between about 20° C. to 30° C.

The extrudate is retained in the pressure chamber for about 80 minutes at which time the extrudate is at about ambient temperature. The extrudate is then removed from the pressure chamber and ground to a size in the range of 0.5 mm to 3 mm.

The resulting particles are formed from hard amorphous coffee glass containing entrapped aromatized coffee oil and gas. When the particles are dropped into a cup of hot water (above about 80° C.) the particles fracture almost instantaneously. Aroma is immediately released and can be detected above the water. The aroma is sniffed and judged to be roasty, coffee-like and balanced. The fractured coffee glass particles dissolve within 1 minute.

We claim:

1. A method of producing coffee particles containing entrapped aroma; the method comprising:

introducing soluble coffee solids into a heating and mixing zone and raising the temperature to form a mass of molten soluble coffee solids;

introducing an aroma-containing substrate into the mass of molten soluble coffee solids to form a molten mixture of the aroma-containing substrate and the molten soluble coffee solids, the molten mixture containing a gas under pressure;

extruding the molten mixture into a pressure zone in which the pressure is greater than the pressure of the gas in the molten mixture and retaining the molten mixture in the pressure zone until the molten mixture solidifies to form a hardened glass; and comminuting the glass into coffee particles.

2. A method according to claim 1 in which the soluble coffee solids are introduced into the heating and mixing zone in the form of a mixture of soluble coffee solids and water.

3. A method according to claim 2 in which the mixture of soluble coffee solids and water is made up of about 90% by weight to about 100% by weight of soluble coffee solids.

4. A method according to claim 3 in which the mixture of soluble coffee solids and water is made up of about 92% by weight to about 100% by weight of soluble coffee solids.

5. A method according to claim 1 in which the temperature of the mass of molten soluble coffee solids is raised to about 10° C. to about 50° C. above the glass transition temperature of the soluble coffee solids.

6. A method according to claim 5 in which the temperature of the mass of molten soluble coffee solids is in the range of about 85° C. to about 130° C.

7. A method according to claim 1 in which the aroma-containing substrate comprises coffee oil and coffee aroma constituents dissolved in the coffee oil.

8. A method according to claim 7 further comprising injecting gas under pressure into the aroma-containing substrate for providing the molten mixture with gas under pressure.

9. A method according to claim 1 in which the aroma-containing substrate comprises a solid frost containing water, carbon dioxide and coffee aroma constituents.

10. A method according to claim 1 further comprising injecting gas under pressure into the mass of molten soluble coffee solids or into the molten mixture for providing the molten mixture with gas under pressure.

11. A method according to claim 1 in which the pressure of the gas in the molten mixture is in the range of about 2.0 MPa to about 7.0 MPa.

12. A method according to claim 1 in which the heating and mixing zone is provided in the form of an extruder.

13. A method of producing coffee particles containing entrapped aroma; the method comprising:

introducing soluble coffee solids and up to 10% by weight water into a heating and mixing zone and raising the temperature to about 85° C. to about 130° C. to form a mass of molten soluble coffee solids;

introducing an aroma-containing substrate into the mass of molten soluble coffee solids to form a molten mixture of the aroma-containing substrate and the molten soluble coffee solids, the molten mixture containing a gas under a pressure of about 2.0 MPa to about 7.0 MPa;

extruding the molten mixture into a pressure zone in which the pressure is greater than the pressure of the gas in the molten mixture and retaining the molten mixture in the pressure zone until the molten mixture solidifies to form a hardened glass; and comminuting the glass into coffee particles of size of about 0.5 mm to 3 mm.

14. A method according to claim 13 in which the aroma-containing substrate comprises coffee oil and coffee aroma constituents dissolved in the coffee oil.

15. A method according to claim 14 further comprising injecting gas under pressure of about 2.0 MPa to about 7.0 MPa into the aroma-containing substrate for providing the molten mixture with gas under pressure.

16. A method according to claim 13 in which the aroma-containing substrate comprises a solid frost containing water, carbon dioxide and coffee aroma constituents.

17. A method according to claim 13 further comprising injecting gas under pressure of about 2.0 MPa to about 7.0 MPa into the mass of molten soluble coffee solids or into the molten mixture for providing the molten mixture with gas under pressure.

* * * * *